(12) United States Patent
Cheng

(10) Patent No.: US 7,523,883 B2
(45) Date of Patent: Apr. 28, 2009

(54) DUAL ROLL-UP WIRE REEL DEVICE WITH RESILIENT POSITIONING

(76) Inventor: Hung-Wen Cheng, 6F, No. 3, Lane 68, San Min Rd., Sung Shan District, Taipei City (TW)

( * ) Notice: Subject to any disclaimer, the term of this patent is extended or adjusted under 35 U.S.C. 154(b) by 0 days.

(21) Appl. No.: 11/775,238

(22) Filed: Jul. 10, 2007

(65) Prior Publication Data

US 2009/0014575 A1     Jan. 15, 2009

(51) Int. Cl.
*B65H 75/48* (2006.01)
(52) U.S. Cl. .................. 242/378; 242/378.1; 242/378.4
(58) Field of Classification Search .................. 242/378, 242/378.1, 378.4
See application file for complete search history.

(56) References Cited

U.S. PATENT DOCUMENTS

| | | | | |
|---|---|---|---|---|
| 7,222,812 B2 * | 5/2007 | Chang et al. | ............. | 242/378.1 |
| 7,364,109 B2 * | 4/2008 | Kuo | ............................ | 242/373 |
| 2006/0011763 A1 * | 1/2006 | Kuo | ......................... | 242/378.1 |
| 2006/0102766 A1 * | 5/2006 | Chang et al. | ............... | 242/378.1 |
| 2007/0295850 A1 * | 12/2007 | Lin | .......................... | 242/378.1 |

* cited by examiner

*Primary Examiner*—Sang Kim
(74) *Attorney, Agent, or Firm*—Leong C. Lei

(57) ABSTRACT

A dual roll-up wife reel device features simultaneous, bi-directional wire roll-up/withdrawal. The wire reel device has a resilient positioning function that effects multi-staged positioning and allows a wire to be wound up and stored in the wire reel device in an organized and managed manner, which ensures optimum and dynamic adjustment of the wire in respect of length control and length management. The wire reel device includes a roll-up disk forming a slide groove having a primary section that selectively accommodate a positioning sphere to set the device in a secured condition and a bypass section extending from the primary section to allow the positioning sphere to move therein for setting the device in a bypassing released condition.

1 Claim, 5 Drawing Sheets

DUAL ROLL-UP WIRE REEL DEVICE WITH RESILIENT POSITIONING

BACKGROUND OF THE INVENTION (a) Technical Field of the Invention

The present invention relates to a dual roll-up wire reel device with resilient positioning, which is applicable to transmission cables of computer information industry, transmission wires or power supply cables of telecommunication network and the likes for storage and organization of wires/cables.

(b) Description of the Prior Art

Electronic devices, especially those for compute information and telecommunication networks, are provided with transmission wires/cables and power supply cables. These wires/cables are conventionally of fixed lengths for each specific device. This causes problems. For a wire that is longer than what is necessary, storage and/or organization is difficult; for a wire that is shorter than what is necessary, operation or use or the wire is not feasible and taking into consideration of connection with a device or site that is distant, addition and combination of more wires or cables are needed. This in turn In other words, the conventional computer peripheral devices or the telecommunication peripheral devices are provided with data transmission wires to serve as transmission media for these conventional peripheral devices. It is common that several sets of wires are used in combination. This causes the problems of wire distribution, organization and management, especially those associated with excessive/insufficient length of wires, entangling of wires, and thus aesthetic problems caused by the previous drawbacks. Users of these peripheral devices are of particular suffering for these problems each time he or she attempts to move or re-locate these devices.

A traditional solution for organizing the excessive length of wire is to bundle the excessive length together. This still suffers the same atheistic and entangling problems. In addition to these problems, bundling wires (or multiple sections of a wire) together may result in undesired problems associated with safety and quality of transmission.

A ball-positioning type wire reel device is currently available in the market and is shown in FIGS. 7 and 8 for discussion. The conventional bail-positioning wire reel device, generally designated at A10, comprises a front cover A1, coil return spring A2, a rotor A3, a transmission wire A4, a rotor A3 to return the wire A4 back into the wire reel device. In particular, the conventional wire reel device 40 has a positioning mechanism that effects positioning by means of the positioning ball A5. To accommodate the positioning ball A5, a number of tracks A31 must be defined in a bottom face of the rotor A3 to receive and to allow for rotation of the positioning ball A5 therein. In this arrangement, when the rotor A3 is subjected to rotation/movement caused by high speed withdrawal and returning of the wire, the tracks 31 are moved in unison with the rotor A3 at the same speed. The high-speed operation of the rotor and the tracks A31 apparently causes instability of the ball A5 accommodated in the tracks A31, and error will be certainly induced. To alleviate the problems, the tracks must be of sophisticated and high-precision manufacturing. This makes the fabrication of molds for making tire wire reel device extremely difficult and also increasing ratio of unacceptable products. As a consequence, costs are heightened and competitively reduced. Further, dislocation of the ball A5 inevitably happens when a abrasion/wearing or excessive tolerance is present in the ware reel device, leading to failure of operation of the wire reel device. The service life is thus shortened.

SUMMARY OF THE INVENTION

The primary purpose of the present invention is to provide a wire reel device that features simultaneous, bi-directional wire roll-up/withdrawal. The wire reel device has a resilient positioning function that effects multi-staged positioning and allows a wire to be wound up and stored in the wire reel device in an organized and managed manner, which ensures optimum and dynamic adjustment of the wire in respect of length control and length management, and this effectively alleviates the above problems and drawbacks associated with a "ball-positioning" wire reel that is currently available in the market.

The construction of the wire reel device of the present invention is based on the following. A roll-up disk is taken as a rotation center and, the wire, with the roll-up disk as a center, is divided into two end sections that are wound around upper and lower decks formed in the roll-up disk. In other words, in withdrawing the same wire that is coiled up ahem the roll-up disk in opposite directions, the roll-up disk is driven to rotate in a constant withdrawing direction and the wire reel device is always maintained at a center of the withdrawn lengths of the wire whereby the wire can be reduced. In addition, a reduced retention or securing force is needed for retention positioning of the withdrawn or extended wire without undesired/unexpected releasing of the wire or unnecessary abrasion/wearing of parts. This, together with the resilient positioning feature of the wire reel device of the present invention, allows for one-actuation fast rolling up of the extended wire or turn-by-turn staged rolling up of the wire.

In construction, the wire reel device of the present invention comprises two mated cover members, a roll-up disk, a wire, a coil return spring, and a positioning sphere. The coil spring has a center end fit into and fixed to a slot defined in a central axle formed on an inside surface of one of the cover members so that the coil spring is set in a one-end fixed condition with respect to the axle; a peripheral end of the coil spring is connected to and thus fixed to the roll-up disk so that cover member and the roll-up disk form a structure that is subjected to constraint effected by the coil spring. Thus, the the roll-up disk, when rotated in the forward direction and reversed direction, drives the coil spring in a strained condition and a released condition, respectively.

The relationship between the roll-up disk and the wire is that a central section of the wire is fit in and fixed to an inside surface of the roll-up disk so is withdrawn in the opposite directions, the wire can be extended simultaneously in the two directions with the same speeds. And this is applicable to the returning of the wire into die wire reel device. Further, the very end terminals of the two end sections of the wire are provided with power connector or telecommunication connector and this makes the wire reel device the best wire/cable roll-up device for data transmission wires, telecommunication network transmission wires, and power cables.

The wire reel device of the present invention also features a positioning mechanism that is operated by interaction and cooperation among the roller-up disk and an inside surface of the cover member opposing the roll-up disk and a positioning sphere, wherein the cover member is provided at the inside surface thereof a multifunctional track that cooperates with the positioning sphere in such a way that rotation of the roll-up disk in the forward direction and the reversed direction alternately and selectively drives the positioning sphere in a secured condition and a released condition, respectively. The positioning sphere is arranged in a slide groove defined in the surface of the roll-up disk to be selectively set in a secured condition or a bypassing released condition.

The feature of the wire reel device of the present invention resides in that roll-up disk, which grooves allow the positioning sphere operate in the secured condition and the bypassing released condition. In addition, with a slit defined in the primary groove, the primary groove exhibits micro-amplitude resiliency to realize correction/adjusting with respect to abrasion/wearing and vibration caused by high-speed movement of the positioning sphere, as well as the original tolerance, to thereby ensure excellent operation of the positioning sphere within the track of the cover member.

In other words, during both withdrawal and returning of the wire, once the positioning sphere induces micro-amplitude offset and thus disengagement from the track of the cover member, the micro-amplitude resiliency provided by the slit defined in the primary groove may automatically realize correction and returning of the positioning sphere. Thus, the function failure caused by dislocation of the sphere due to abrasion/wearing in the conventional device can be completely resolved. In addition, the primary groove and the bypass groove extending sideway from the primary groove realize a combination of secured mode and bypassing released mode. When the positioning sphere in set in a released condition where the wire is returned back into the wire reel device, the positioning sphere moves into the bypass groove so that the and protecting and extending service life of the positioning sphere.

The above discussed structure allows the wire reel device of the present invention to realize dual-direction withdrawal, rolling up, and retention positioning and also helpful in removing the problems of function failure caused by ball dislocation encountered in the conventional devices.

To conclude, the present invention provides a dual roll-up wire reel device with resilient positioning, which has the following advantages:

(1) A multifunctional track is formed on an inside surface of a cover member and such a track is of a fixed and stable construction so that the problem of excessive and uncorrectable error caused by the conventional arrangement where tracks that accommodate a positioning ball must rotate/move with the rotor in the conventional wire reel device is eliminated.

(2) A primary groove and a bypass groove extending from the primary groove are defined in a surface of a roll-up disk for realizing a combination of a secured condition end a bypassing released condition at the time when a wire is fast withdrawn or returned, whereby abrasion/wearing of the positioning sphere is reduced and the positioning sphere is protected and service life is extended. respect to abrasion/wearing end vibration caused between the positioning sphere and the cover member, as well as the original tolerance, to thereby ensure excellent operation of the positioning sphere within the track of the cover member.

(4) Spheres are rotatably embedded in the surface of the roll-up disk to significantly reduce the friction induced on the surface of the roll-up disk to thereby reduce the loading on a return spring when the wire is withdrawn and/or returned and thus providing excellent feeling of operation.

(5) Guide rollers are provided at outlet openings of the mated cover members to significantly reduce the loading acting on the roll-up disk and the return spring when the wire is withdrawn end/or returned to ensure proper guiding of the wire and provide excellent feeling of operation.

(6) A reinforcing ring is fit over a central axle formed on one of the cover members to enhance mating between the cover members tied to ensure structural strength and stability.

The foregoing object and summary provide only a brief introduction to the present invention. To fully appreciate these and other objects of the present invention as well as the invention itself, all of which will become drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF TO DRAWINGS

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
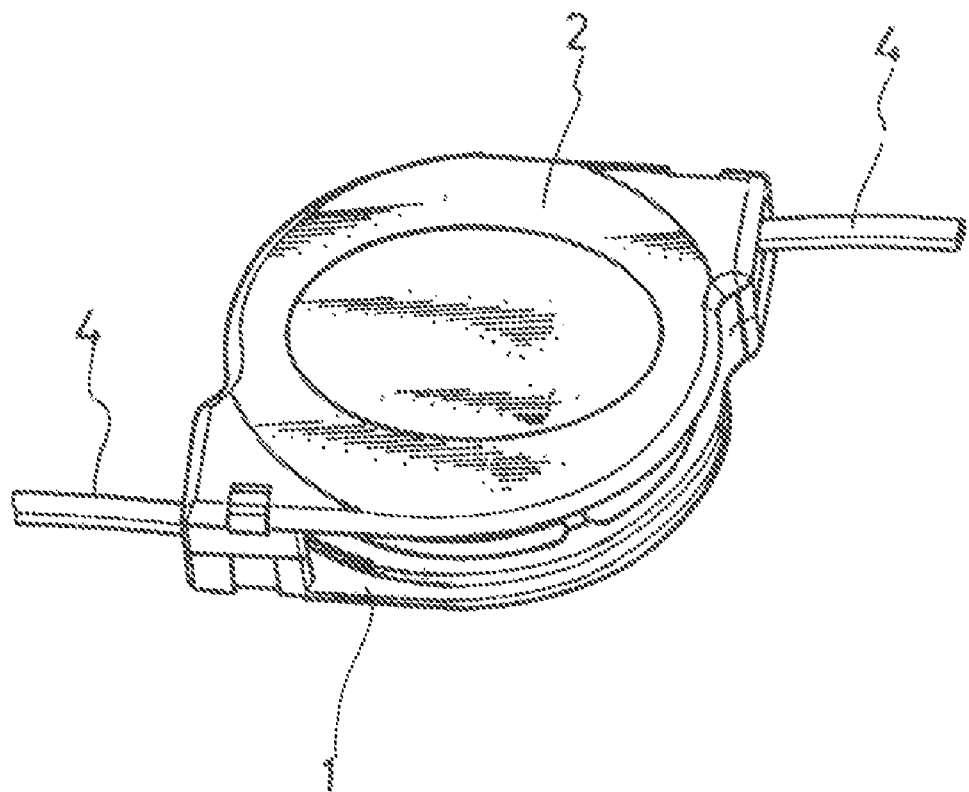
FIG. 1 is a perspective view of a wire reel device constructed in accordance with the present invention.
Figure 2:
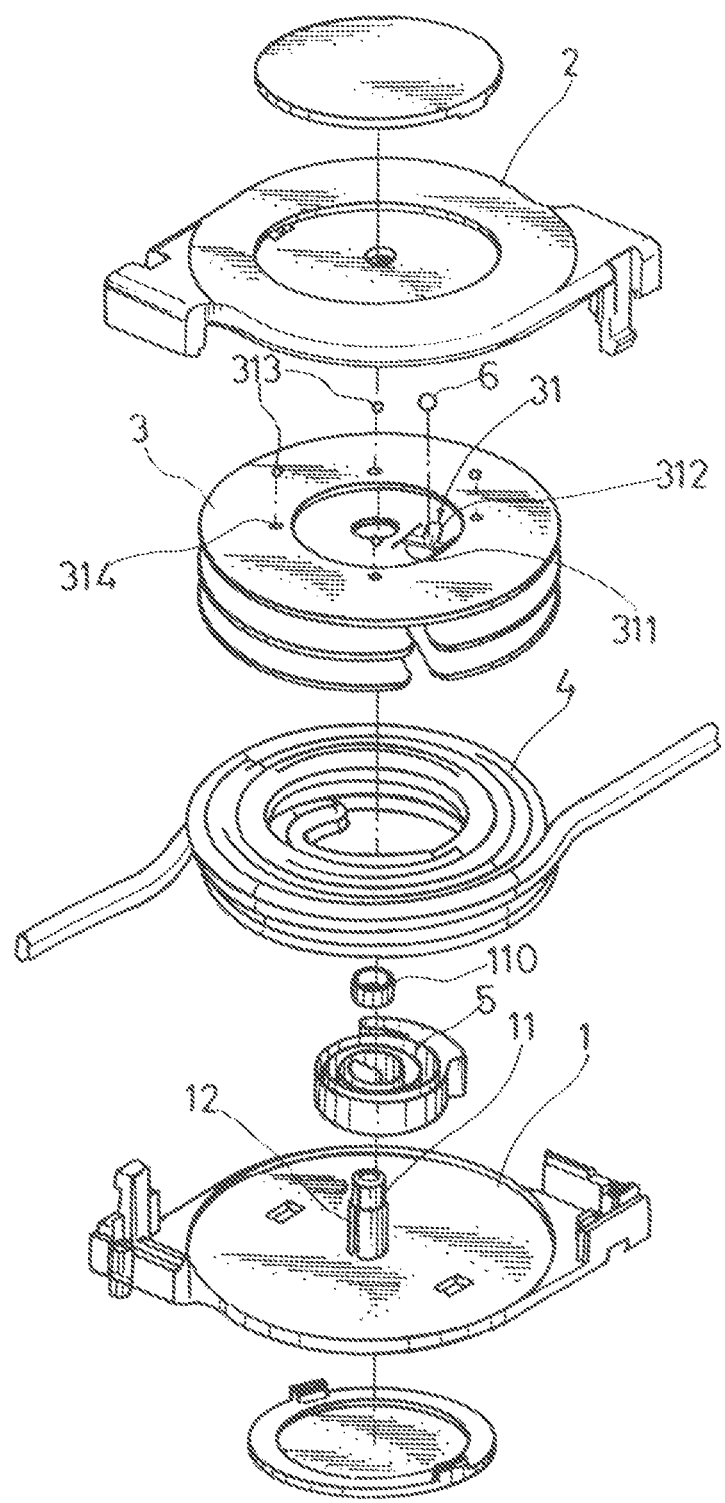
FIG. 2 is an exploded view of the one wire device of the present invention.

With reference to the drawings and in particular to FIGS. 1 and 2, a wire reel device constructed in accordance with the present invention is shown. The wire reel device comprises two cover members 1, 2 that mate together, a roll-up disk 3, a wire 4, a return spring 5, and a positioning sphere 6. The return spring 5 is a coil spring in the embodiment illustrated and has a center end and a peripheral end. The center end of the coil spring 5 is attached to a central axle 11 formed on an inside surface of the first cover member 1 by engaging a slot 12 defined in the axle 11. A reinforcing ring 110 is fit over the axle 11 to ensure structural strength and stability, and also enhance the mating between the cover members 1,2. The peripheral end of the coil direction and reversed direction, the coil spring 5 is stained and released respectively. The straining of the coil spring 5 stores energy, which subsequently effects coiling up (and thus returning) of the wire 4 after a withdrawn length of the wire 4 is released.

The wire 4 is fixed to the roll-up disk 3 by a central section thereof so that end sections of the wire 4 on the opposite sides of the central section are windable around the roll-up disk 3. In this respect, the roll-up disk 3 is constructed in a two-decked manner comprising upper and lower decks defining ring-like spaces for respectively receiving, in a rolled up manner, the two end sections of the wire 4.

The wire reel device of the present invention also comprises a positioning mechanism that is constituted in part by the positioning sphere 6 that is arranged between and interact with an inside surface of the second cover member 2 and a major surface of the roll-up disk 3 that faces the second cover member 3.

Figure 3:
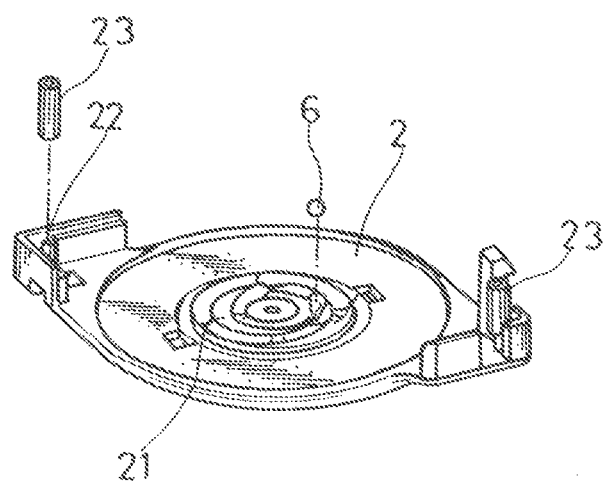
FIG. 3 illustrates spatial relationship among a cover member, a positioning sphere, and guide rollers of the wire reel device of the present invention.

As best seen in FIG. 3, the inside surface of the second cover member 2 forms a multi-functional track 21, which, together with the forward/revered direction rotation of the roll-up disk 3, functions to selectively and alternately defined in the surface of the roll-up disk 3 and configured in such a way that the positioning sphere 6 is selectively set in a secured condition or a bypassing released condition.

Figure 4:
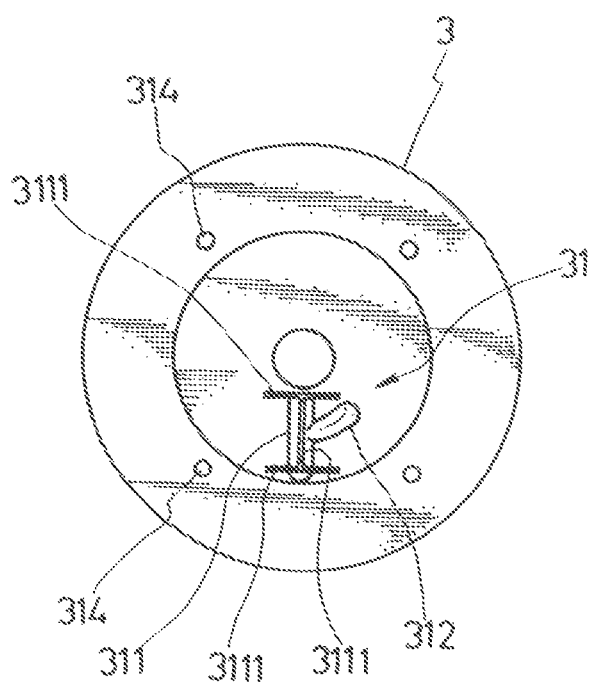
FIG. 4 is a plan view showing a roll-up disk of the wire reel device of the present invention.
Figure 5:
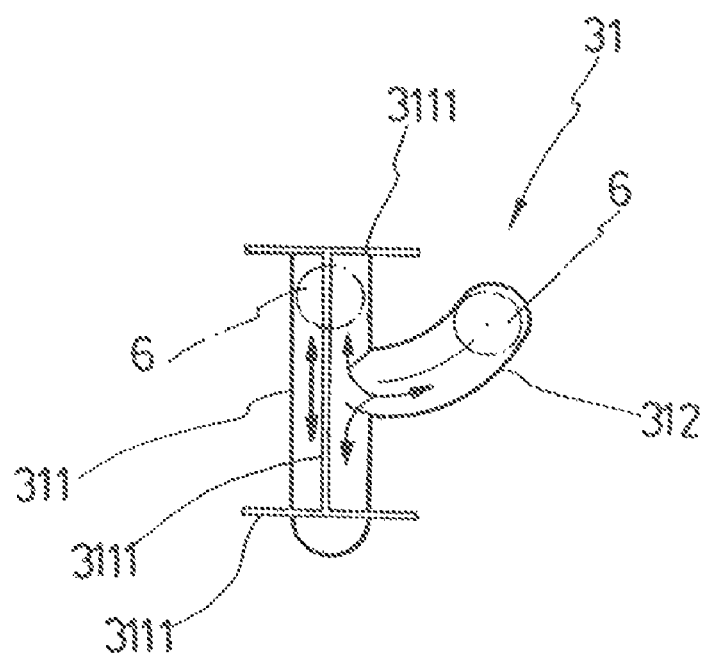
FIG. 5 is a schematic view illustrating the configuration of a slide groove defined in the roll-up disk of the wire reel device and the movement of the positioning sphere in the slide groove in accordance with the present invention.
Figure 6:
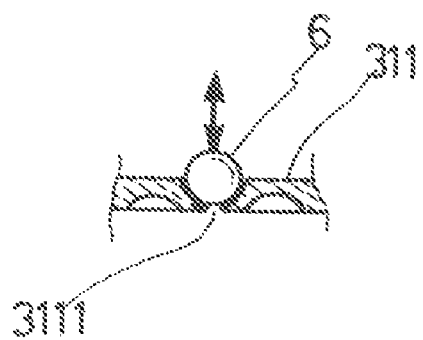
FIG. 6 is a cross-sectional view of a slide groove of the roll-up disk, illustrating micro-amplitude adjustment effected by the slide groove.
Figure 7:
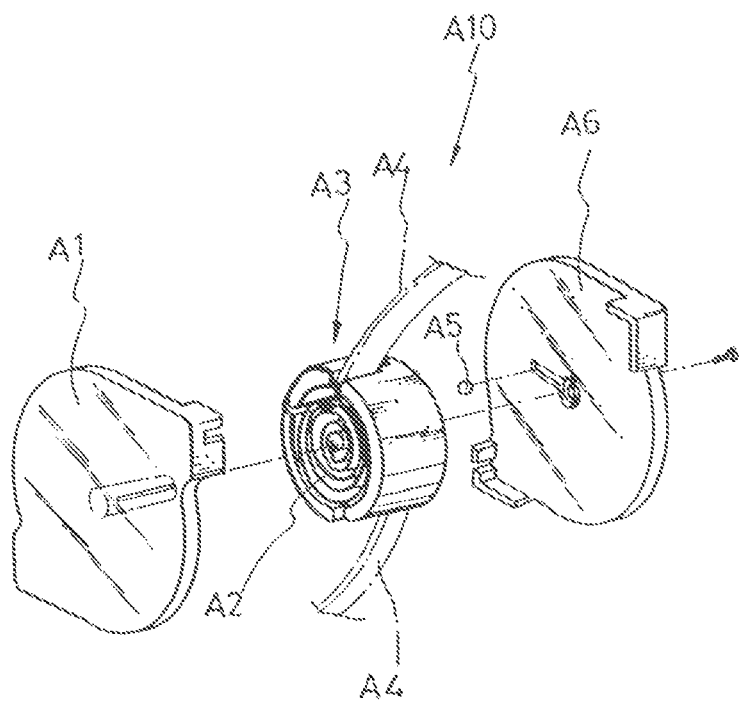
FIG. 7 is an exploded view of a conventional wire reel device.
Figure 8:
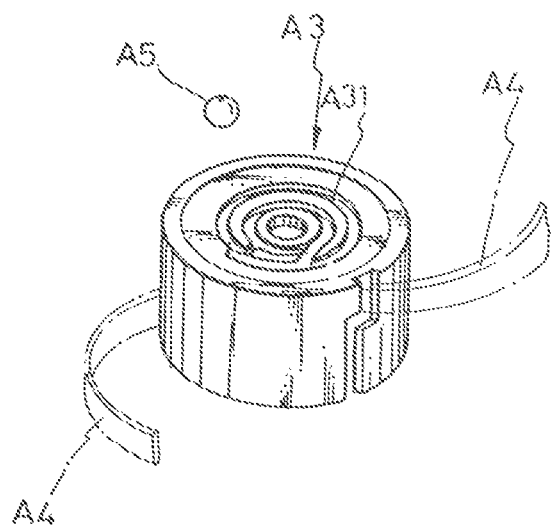
FIG. 8 is a perspective view of a rotor of the conventional wire reel

As shown in FIGS. 4 end 5, the slide groove 31 defined in the surface of the roll-up disk 3 is constituted by a primary groove 311 and a bypass groove 312 in communication with and sideway extending from the primary groove 311. The primary groove 311 and the bypass groove 312 are arranged to allow the positioning sphere 6 to alternately and selectively move into the primary groove 311 and the bypass groove 312 respectively in the secured condition and the bypassing released condition when the wire 4 is withdrawn and released respectively. In other words, when the wire 4 is withdrawn out of the wire reel device, the positioning sphere 6 is set to the secured condition by being moved into the primary groove 311. When the wire 4 is released to return to the wire reel device, the positioning sphere 6 is moved into the bypass groove 312 so as to avoid unnecessary abrasion/wearing and extend the service life of the sphere 6.

Further, within the primary groove 311, a slit 3111 is defined to effect micro-amplitude resiliency when the primary groove 311 is subjected to between the positioning sphere 6 and the cover member 1, as well as the tiny original errors, thereby ensuring excellent and correct of operation of the positioning sphere 6 within the track 21 of the cover member.

As shown in FIGS. 2 and 3, in accordance with the construction of the present invention, to eliminate friction and thus reduce the loading against the spring 5, a plurality of spheres 313 is provided on the surface of the roll-up disk 3. The spheres 313 are rotatably received in dimples 314 defined in the surface of the roll-up disk 3 to effect effort-saving rotation thereby reducing the loading of the spring and providing excellent operation feeling for the user. In addition, pivots 22 are provided at outlet openings of the mated cover members to rotatably support guide rollers 23 for correctly guiding the wire 4 and reduce the loading against the spring to once again provide excellent operation feeling for the user.

Although the present invention has been described with reference to the preferred embodiment thereof, it is apparent to those skilled in the art that a variety of modifications and changes may be made without departing from the scope of the present invention which is intended to be defined by the appended claims. differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A dual roll-up wire reel device comprising:
   a first cover member having an inside surface provided with a central axle, said central axle having a slot;
   a reinforcing ring fitted over said central axle;
   a wire having a central section and two end sections;
   a roll-up disk rotatably mounted on said first cover member, said roll-up disk having an upper deck and a lower deck defining spaces for respectively receiving in a rolled-up manner said two end sections of said wire, said roll-up disk having a top surface formed with a slide groove constituted by a primary groove and a bypass groove in communication with and extending from said primary groove, said primary groove having a slit for effecting micro-amplitude resiliency when said primary groove is subjected to pressure induced by a positioning sphere;
   said central section of said wire being fixed to said roll-up disk thereby enabling said two end sections to opposite side of said central section to be winded around said roll-up disk;
   a return coil spring having a center end and a peripheral end, said center end being attached to said central axle of said first cover member, said peripheral end being fixed to said roll-up disk so that when said roll-up disk is rotated, said return coil spring will be strained or released depending on rotating direction of said roll-up disk,
   a second cover member engaged with said first cover member, said second cover member having an inside surface formed with a track;
   said positioning sphere arranged between and interact with said inside surface of said second cover member and a major surface of said roll-up disk that faces said second cover member;
   said track functioning to selectively and alternately switch said positioning sphere between a secured condition and a released condition in case of forward and reversed direction rotation of said roll-up disk;
   said primary groove and said bypass groove being arranged to allow said positioning sphere to alternately and selectively move into said primary groove and said bypass groove respectively in said secured condition and said released condition when said wire is withdrawn and released respectively, said wire being set to said secured condition by being moved into said primary groove when said wire is withdrawn out of said wire reel device, said positioning sphere being moved into said bypass groove when said wire is released to return to said wire reel device;
   a plurality of spheres rotatably received in dimples on a surface of said roll-up disk; and
   pivots provided at outlet openings of said first and second cover members to rotatably support guide rollers for guiding said wire and reducing loading against said return coil spring.

* * * * *